July 3, 1956   L. D. STATHAM ET AL   2,753,469
ACCELEROMETERS
Original Filed Dec. 18, 1950   4 Sheets-Sheet 1
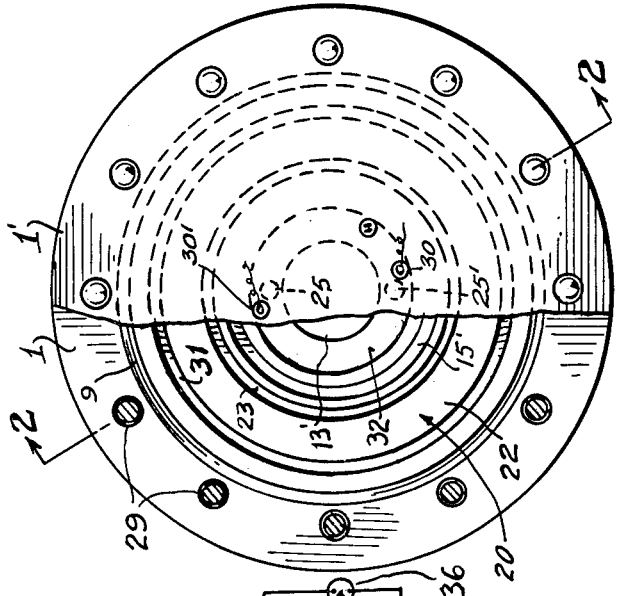
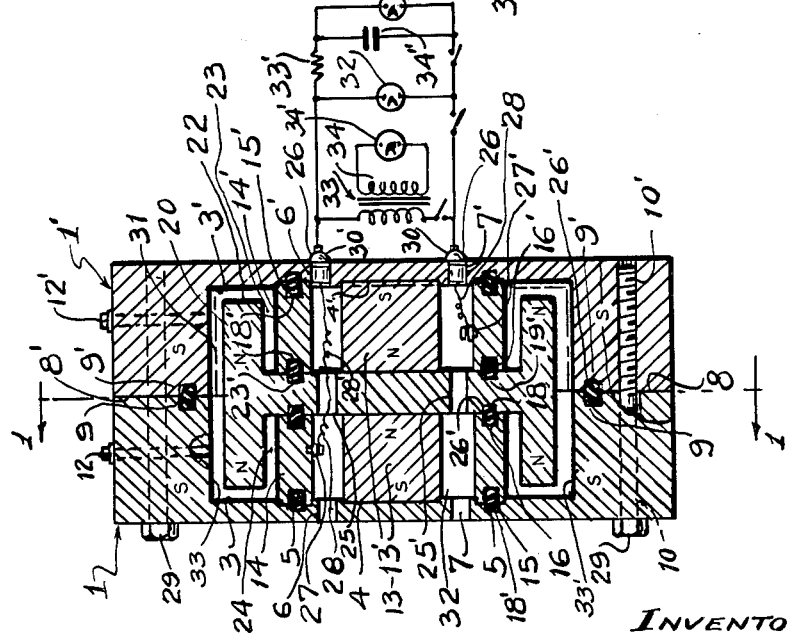
INVENTORS
LOUIS D. STATHAM &
BY SAUL EPSTEIN
ATTORNEY.

July 3, 1956 L. D. STATHAM ET AL 2,753,469
ACCELEROMETERS
Original Filed Dec. 18, 1950 4 Sheets-Sheet 2
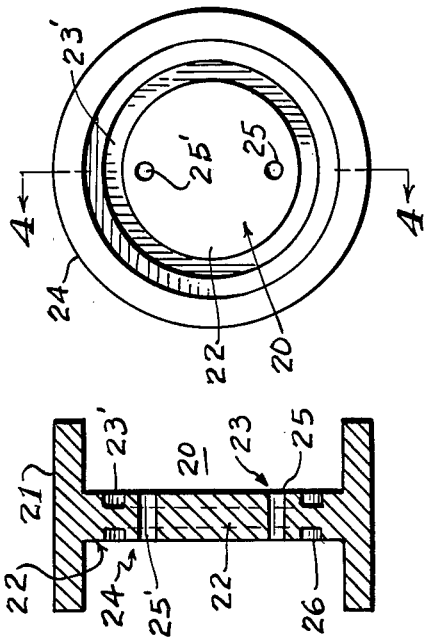
INVENTORS.
LOUIS D. STATHAM &
BY SAUL EPSTEIN
ATTORNEY.

INVENTORS.
LOUIS D. STATHAM &
BY SAUL EPSTEIN
ATTORNEY.

July 3, 1956 L. D. STATHAM ET AL 2,753,469
ACCELEROMETERS
Original Filed Dec. 18, 1950 4 Sheets-Sheet 4

INVENTORS.
LOUIS D. STATHAM
BY & SAUL EPSTEIN

Philip Subkow
ATTORNEY.

United States Patent Office 2,753,469
Patented July 3, 1956

1

2,753,469

ACCELEROMETERS

Louis D. Statham, Beverly Hills, and Saul Epstein, Sherman Oaks, Calif., assignors to Statham Laboratories, Inc., Los Angeles, Calif., a corporation of California Continuation of abandoned application Serial No. 201,384, December 18, 1950. This application June 1, 1954, Serial No. 433,659

15 Claims. (Cl. 310—11)

This invention relates to motion responsive devices for indicating the magnitude and the nature of said motion. It belongs to the general class of vibrometers, velocimeters, and accelerometers.

A classic example of such systems, as employed in the prior art, is a seismic system in which an inertial mass is suspended by springs in a frame, and the displacement of the mass with respect to the frame is taken as a measure of the magnitude of the displacement and character of the force causing the displacement.

In all such systems a mechanical system for suspension of the inertial mass is necessary, imposing, particularly where the motion is cyclical as in the case of vibrometers, critical limitations on the frequencies at which the system will give a faithful response.

In addition, the limitations on the nature of the springs which may be employed and the means by which the mass may be suspended, such constructions impose both mechanical limitations on size of the unit and on the frequency response characteristics of the unit.

In the motion responsive device of this invention we employ an inertial system which avoids such mechanical suspensions of an inertial mass. Instead of a solid mass suspended in springs or equivalent suspension means, we employ a liquid mass. The liquid is contained in a chamber so that there is a relative motion of the chamber walls with respect to the liquid under the influence of the forces which impose a motion on the chamber; which motion it is the duty of the instrument to detect and measure. We also position in the unit a motion sensing device which will detect the nature of this relative motion and translate it into a measure of the displacement of the chamber or of its velocity or acceleration which has caused this relative displacement.

We have chosen, in the form of our invention disclosed in the present application, to employ a relatively conductive fluid and to position the container and the fluid with respect to a magnetic field so that upon the relative movement of the fluid and the chamber walls, potential differences will be induced at spaced points in the fluid in a direction transverse to the lines of force of the magnetic field and to the direction of relative motion of the fluid mass and chamber walls, which potential difference is responsive at any instant of time to the instantaneous velocity of the relative motion of the fluid and chamber walls. If this velocity is a variable one, due to an acceleration of the chamber walls, this potential will also vary in phase and in proportion to the acceleration, and therefore we may measure this variation of potential and thus the acceleration of the chamber walls and of the forces inducing this displacement.

These and other objects of our invention will be further described in connection with the drawings, in which Fig. 1 is a plan view with parts broken away on line 1—1 of Fig. 2, and parts in section of one form of our motion measuring device applicable to rotary motions;

Fig. 2 is a section taken on line 2—2 of Fig. 1;

2

Fig. 3 is a vertical section on a diameter of one of the outer cup elements;

Fig. 4 is a vertical section of another element of the device taken on line 4—4 of Fig. 5;

Fig. 5 is a plan view of the element shown in Fig. 4;

Fig. 6 is a vertical section of another element of the device taken on a line similar to 2—2;

Figure 7:
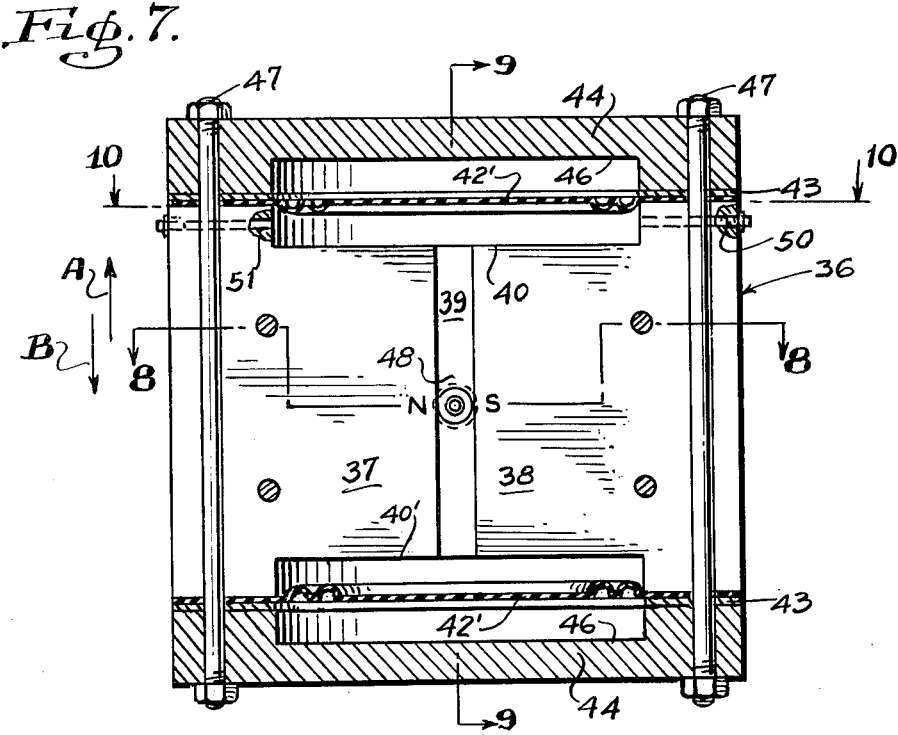
Fig. 7 is a vertical section of another form of our device taken on line 7—7 of Fig. 8.
Figure 8:
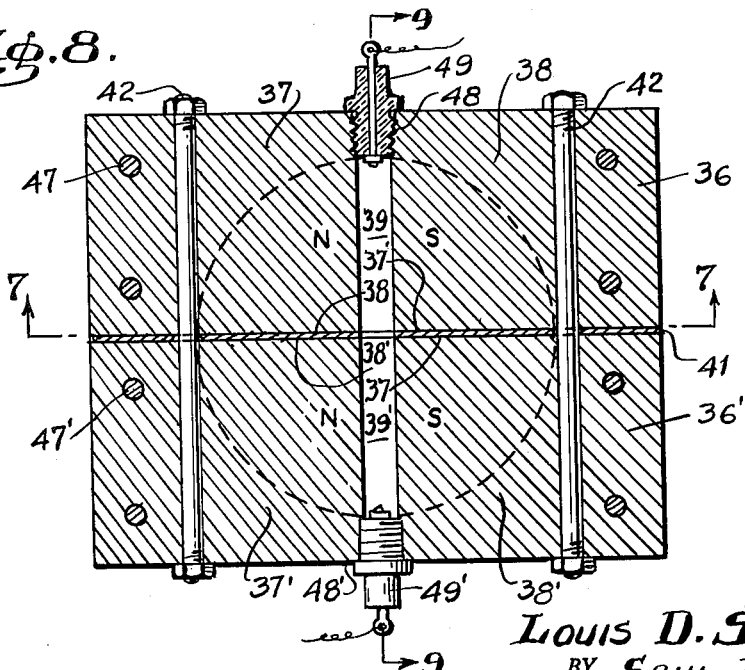
Fig. 8 is a section taken on line 8—8 of Fig. 7.

In the form of motion responsive device shown in Figs. 1 to 6, inclusive, the cup-shaped cylindrical member 1 (see Figs. 1 to 3), having a bottom 2 and a circumferential wall forming a central cup 3, has axially disposed of said member a circular depression 4 and an outwardly disposed concentric annular groove 5. Bores 6 and 7 positioned in the bottom 2 intersect the cup 3. The top surface of the wall 8 carries an annular groove 9 concentric with the cylindrical member 1. Spaced bores 10 are also provided in the wall 8 at spaced points circumferentially disposed in the member 1. A horizontal bore 11 passes through the wall 8 and intersects the cup 3 and is suitably plugged on the exterior of the wall 8 by a plug 12.

Two such units 1 and 1' are provided, as will be described below. They are alike and the parts distinguished by priming the member, and what is said of the unit 1 and the parts thereof is true also of unit 1' and the equivalent parts thereof bearing the prime numbers.

A cylindrical magnet 13 and an electrically conductive, preferably non-magnetic ring 14, such as a brass ring, are concentrically positioned in the depression 4. The conductive ring 14 carries a contact terminal 27, in the inner wall of the ring, to which terminal an insulated, electric terminal 30 is connected. The ring has annular grooves 15 and 16 positioned in its top and bottom. An O ring 18' is positioned in the annular grooves 15 and 18 in the annular groove 16.

The ring member 20, having an I cross section (see Figs. 4 and 5) is formed of a ring 21 with a disk-shaped transverse wall 22 positioned midway in the ring to form an upper cup 23 and a lower cup 24. An annular groove 23' is positioned in one surface of the wall 22 and an annular groove 26 is positioned in the other surface of the wall 22. Bores 25 and 25' are also provided in the wall 22. The member 20 is positioned on top of the ring 14 with an O ring 18 positioned in the groove 16 and in the annular groove 24 with the conductor wire 28 threaded through the bore 25. The magnetic cylinder 13' of the same construction as 13 is set centrally of the ring 22 opposite 13 and the ring 14' (see also Fig. 6) is positioned concentrically of the cylinder 13'. While the contacts 27 and 27' may be diametrically opposed, as indicated in the drawing, this is not essential. Conductor wires 28 and 28' are connected to insulated terminals 30 and 30'. The O ring 19' is suitably positioned in the groove 16' and the O ring 18' in the groove 15. The O ring 26 is set in the groove 9' and the cup 1' is set so that the O ring 26 fits into the groove 9'. The bolts 29 are placed into the bores 10 and 10' and the unit thus assembled. It will be observed that the unit is symmetrical above and below the meeting planes of 1 and 1'. The outer and inner diameters of the ring 20 and the outer diameter of ring 14 and the height of the wall 22 of the ring 20 and the depth of the chamber 3 are such that an annular groove or channel 31 of C-shaped cross section is formed with an annular open chamber 32 surrounding the cylindrical magnets 13 and 13' and positioned between the magnet and the ring 14 and 14'.

By removing the plugs 12 and 12', the annular channel 31 may be filled with a conductive liquid. We may employ an electrolyte solution, mercury, or, if the temperature at which the unit is to operate is suitable, we may employ gallium or metallic alloy of suitable melting point. All surfaces in contact with the fluid, except the surfaces of rings 14 and 14' in contact with the fluid, are coated with an insulating coating 33' such as an enamel or other coating well known in this art to give an insulating surface.

The rotation of this unit about its central axis so as to cause it to accelerate angularly causes a relative motion of the fluid inside the annular chamber 31 due to the inertia of the fluid mass. This will cause a relative displacement of the fluid and chamber walls. The two magnets 13 and 13' are so positioned as to have opposed pole faces of like magnetic polarity, i. e., with north and south pole of 13 facing the north and south poles respectively of 13', and since the units 1 and 20 form pole pieces for the magnets, the displacement of the fluid in its annular chamber will cause it to cut the lines of force of the magnetic field of these magnets. It will be observed that the direction of the tangent of the angular motion is perpendicular to the direction of the lines of force cut by the fluid and that the contacts 27 and 27' are displaced, in the form shown in the drawing, in a vertical direction perpendicular to the said tangent and to the direction of the lines of force.

Potential difference are thus set up in the fluid. The potential between the contacts at 27 and 27' will be proportional to the angular velocity of the ring of fluid with respect to the metallic wall of the chamber containing the same. Thus the potential difference set up between 27 and 27' will be a measure of this relative velocity.

It is evident also that we may measure either the potential difference or the current flowing between 27 and 27' by any conventional and suitable sensitive means, as will be understood by those skilled in the art. This is schematically illustrated by the voltmeter 32.

It will also be evident that the variation in potential between 27 and 27', being proportional to the instantaneous angular velocity of the unit, will be proportional to and be a measure of the angular acceleration of the unit, and therefore we may by suitable means measure this variation. We illustrate this by a transformer 34, the primary of which is connected to 27 and 27' and the secondary of which may be connected to any measuring instrument, such as a voltmeter 34'. The transformer output voltage from the secondary of the transformer in this arrangement is proportional to the rate of variation of the input voltage to the primary.

Our motion sensitive device may also act as a vibrometer and measure the displacement of the unit or any member on which it is mounted by connecting the terminals 27 and 27' to an integrating circuit, shown schematically by means of the resistance 33' and capacitance 34'' and potential measuring device, shown as voltmeter 36. Any suitable and conventional circuit having this function may thus be used.

The same principles may be applied to an instrument for measuring linear velocity and acceleration instead of angular velocity and acceleration.

This is illustrated in Figs. 7, 8, 9 and 10. In this structure a U-shaped magnet 36 is formed so that its pole pieces 37 and 38 are separated by a narrow slot 39 and connected by a base 48. A similar U-shaped magnet 36', having pole pieces 37' and 38' connected by a base 48' is positioned face to face and separated by a gasket 41. Bolts 42 hold the two magnets together forming a rectangular channel 39 and 39' bounded by the poles and connecting both sections 48 and 48'.

Figure 9:
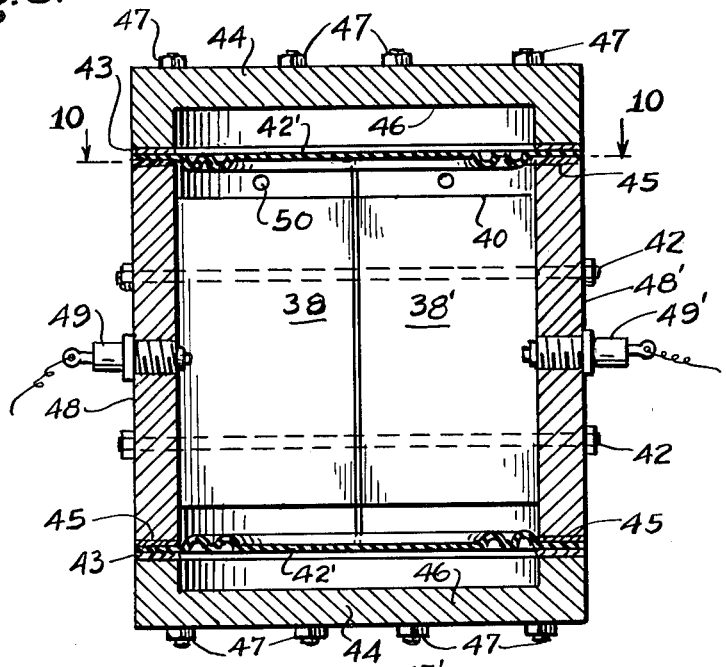
Fig. 9 is a section taken on line 9—9 of Fig. 7.
Figure 10:
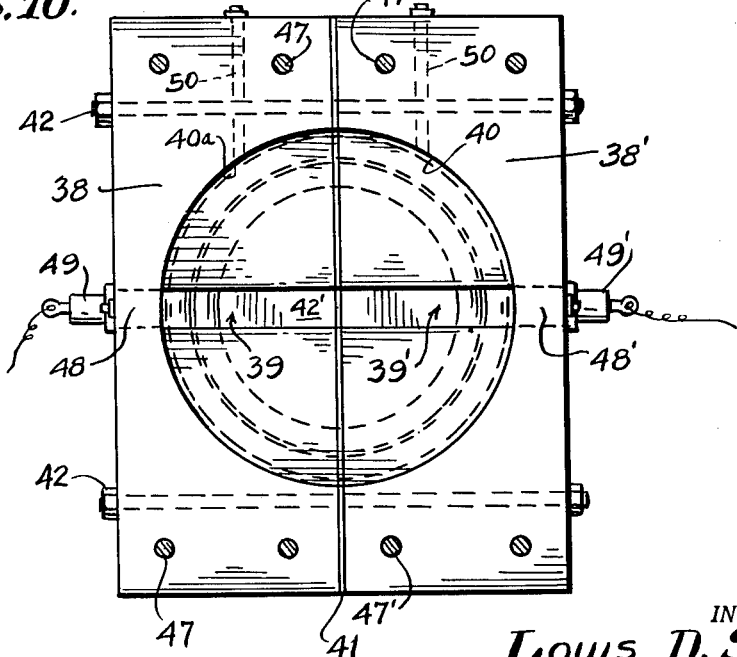
Fig. 10 is a section taken on line 10—10 of Figs. 9 and 7.

Semi-circular depressions 40 and 40' are formed in each end of the magnets 36 and 36' of such form that when assembled a cylindrical cup-shaped depression is formed intercepted by the ends of a rectangular channel formed by the grooves 39 and 39' (see Figs. 7 and 9). A diaphragm 42' and gasket 43 are fitted over each of the cup-shaped depressions made up of 40 and 40' and a cover 44 is set over a gasket 45. Each of the covers is relieved with a cylindrical depression 46 and fitted over the diaphragms 42'. A similar construction is used at each end of the unit. Bolts 47 hold the top 44 and 44' in position with the joints suitably sealed by gaskets.

Conductor plugs are provided in the bases 48 and 48', and electrical terminals are positioned therein. Plugged filler bores 50 and 51 are provided for filling the unit with conductor fluid.

The space between the diaphragms, to wit, 40, 40' and 39 and 39', may be filled with a conductive fluid such as mercury, or if the temperature at which the unit is to be used is suitably high, gallium or low melting metallic alloy may be employed.

All surfaces, except the metallic ends of terminals 49 and 49', in contact with the conductive fluid are painted with an insulating paint similarly to the form shown in Figs. 1 to 6, inclusive.

We thus have a magnet in which is positioned a conduit connected to two chambers each having a yieldable wall. The chambers and conduit are filled with a conductive fluid and the magnetic lines of force pass through the conduit. It will thus appear that the movement of the unit in the direction A or B, i. e., in a direction perpendicular to the lines of force between the pole pieces 37 and 38 or 37' and 38', will cause the fluid to move relatively to the conduit walls and into the chambers fitted with the diaphragms, which form a yieldable wall. These chambers are separated in the direction of motion to be measured and the movement of the fluid across the lines of force of the magnetic field will create a potential difference between the terminals 49 and 49' which, in the form illustrated in the drawing, are spaced apart in a direction perpendicular to the direction of motion and the lines of force. This potential difference may be measured and interpreted in the manner described in connection with Fig. 2.

While in the above description the positions are defined as perpendicular to each other, since the best results are obtained in such a position, it is sufficient that the motion of the fluid mass be in a direction to cut the lines of force and thus any motion at an angle to the lines of force may be used. In like manner, the disposition of the points at which the potential difference is measured may be at 90° or at any acute angle to the direction of the lines of force and to the direction of motion.

It will be observed that the only damping forces which are imposed on these units, omitting the influence of the external electrical circuits, are the effects of friction and viscosity on the movement of the fluid in the chamber. In the form shown in Figs. 1 to 6, inclusive, no mechanical suspension, such as hinges, pivots, springs and other mechanical elements such as are necessary when any solid seismic means are used, is employed in this construction. Thus, as we have found, there appears to be no frequency which is high enough to limit the function of the device and it is thus effective at high frequencies at which mechanical systems are inoperative. Additionally, the instrument does not have a maximum range, that is, it is independent of the number of degrees through which the angular acceleration persists and will faithfully record the acceleration throughout the range of its persistence.

In addition, this form has the property that there is a minimum frequency and a minimum instantaneous velocity at which it will function. The motion must not be so slow and the acceleration so low that the friction and viscosity of the fluid will prohibit any differential motion between the case and the fluid.

These characteristics also apply to the form shown in Figs. 7 to 10, inclusive, except the spring constant of the diaphragms 42 and 42' affect the frequency response characteristics of the unit.

While we have described a particular embodiment of our invention for the purpose of illustration, it should be understood that various modifications and adaptations thereof may be made within the spirit of the invention as set forth in the appended claims.

This application is a continuation of application, Serial No. 201,384, filed December 18, 1950, now abandoned.

We claim:

1. A motion responsive device, which comprises a closed chamber, a conductive fluid in said chamber, a magnet positioned in said device with its poles oriented to establish a magnetic field in said chamber, electrical terminals positioned in the walls of said chamber and spaced transversely of the lines of force of said magnetic field, whereby a potential difference is established between said terminals on motion of said chamber to cause relative motion of the fluid in said chamber in a direction transverse to the lines of force of said magnetic field and said spacing of said electrical terminals.

2. A motion responsive device, which comprises a closed chamber, a conductive fluid in said chamber, a magnet positioned in said device with its poles oriented to establish a magnetic field in said chamber, electrical terminals positioned in the walls of said chamber and spaced perpendicularly to the line of force of said magnetic field, whereby a potential difference is established between said terminals on motion of said chamber to cause relative motion of the fluid in said chamber in a direction transverse to the lines of force of said magnetic field and said spacing of said electrical terminals.

3. A motion responsive device, which comprises a magnet, an annular chamber surrounding said magnet, a conductive fluid in said chamber, spaced electrical contacts positioned in the walls of said chamber and spaced apart in the direction transverse to the direction of the lines of force of said magnet and to the direction of fluid flow, whereby a potential difference is established between said contacts on rotation motion of said device about the axis of said chamber.

4. A motion responsive device, a magnet, a closed channel positioned between the poles of said magnet, a conductive fluid in said channel, electrical contacts in said channel spaced apart in a direction transverse of the lines of force of the magnetic field of said magnet through said channel, whereby a potential difference is established between said terminals on motion of said chamber to cause relative motion of the fluid in said chamber in a direction transverse to the lines of force of said magnetic field and said spacing of said electrical terminals.

5. A rotary motion responsive device comprising a magnet, a cup-shaped pole piece for said magnet positioned on the poles of said magnet, a second ring-shaped pole piece positioned on said magnet and spaced from the walls of said cup-shaped pole piece, an annular closed fluid channel between said pole pieces, a conductive fluid in said channel, and electrical contacts in the walls of said channel spaced in a direction transverse of the lines of force of said magnet between said pole pieces, whereby a potential difference is established between said contacts on rotation motion of said device about the axis of said chamber.

6. A motion responsive device comprising a chamber having a yieldable wall, a conduit connected to said chamber, a second chamber connected to said conduit, a magnet, said conduit being positioned between the poles of said magnet, a conductive fluid in said conduit, and electrical contacts positioned in said conduit separated from each other in a direction transverse to the direction of the lines of force of said magnet through said conduit.

7. A motion responsive device which comprises a plurality of separated chambers, each having a yieldable wall, a conduit interconnecting said chambers, a magnet having its poles arranged to direct its field across said conduit, a conductive fluid in said chambers and conduit, and a pair of electrical contacts in said conduit spaced from each other in a direction transverse to the direction of separation of said chambers and of said field.

8. A motion responsive device comprising a pair of magnets, means for holding said magnets with like poles adjacent to form a conduit between opposite magnetic poles of said magnets, a chamber formed in said magnets at each end of said conduit, a diaphragm cover for each of said chambers, a conductive liquid in said chambers and conduit, and electrical contacts in said conduit spaced apart in a direction transverse to the direction of separation of said chambers.

9. A rotary motion responsive device, which comprises a magnet, an annular chamber surrounding said magnet, walls for said chamber, a conductive fluid in said chamber, spaced electrical contacts positioned in mutually insulated electrically conductive walls of said annular chamber, said contacts being spaced in a direction transverse to the direction of the lines of force of said magnet, whereby a potential difference is established between said contacts on rotary motion of said device about the axis of said chamber.

10. A motion responsive device, comprises a hollow magnetic case, centrally disposed magnets in said case, a ring-shaped pole piece having an I cross-section in magnetic contact with said magnets and the walls of said magnetic case, a fluid-tight ring-shaped electrically conductive barrier wall surrounding said centrally disposed magnets and forming an annular chamber in said case and enclosing the ends of said I-shaped ring, electrically conductive fluid in said chamber, and electrical contacts connected to said barrier wall spaced apart in said barrier wall in a direction transverse to the magnetic lines of force in said annular chamber, whereby a potential difference is established between said contacts on rotary motion of said device about the axis of said chamber.

11. A motion responsive device, which comprises a chamber, a closed continuous liquid channel in said chamber, a liquid in said channel, said liquid flowing with respect to said channel on angular acceleration of said chamber, an electrical circuit associated with said channel and said liquid, and means cooperating with said liquid to produce a potential difference in said circuit in response to the relative motion of said chamber and liquid.

12. A motion responsive device, which comprises a case, a closed continuous annular channel in said case, a liquid in said channel, an electrical circuit connected to said case and operatively associated with said channel and said liquid, and means cooperating with said liquid to produce a potential difference in said circuit in response to the degree of motion of said liquid around said channel on angular acceleration of said case.

13. A motion responsive device which comprises a cylindrical container, an annular chamber positioned in said container, said chamber having an electrically insulated wall and an electrically conductive wall, a magnet having a ring-shaped pole piece positioned within the annular chamber and spaced from said electrically conductive wall, an electrically conductive fluid in said annular chamber, electrical contacts in said electrically conductive wall of said annular chamber, said electrical contacts being spaced in said wall in a direction transverse to the magnetic lines of force of said magnet, whereby a potential difference is established between said contacts on rotary motion of said device about the axis of said chamber.

14. A motion responsive device for sensing angular motion, which comprises a chamber, a closed continuous liquid channel in said chamber, a liquid mass in said channel, said liquid mass forming an endless liquid loop in said channel, said chamber and channel being movable with respect to said liquid mass on angular acceleration of said chamber, to cause a relative circulatory motion of said liquid within said channel relative to the walls of said channel, and means in said chamber cooperating with said liquid on relative motion of said liquid and said channel walls, to sense the magnitude of the relative displacement of said liquid and said walls.

15. A motion responsive device for sensing angular motion, which comprises a case, a closed continuous annular channel in said case, a liquid mass in said channel, said liquid mass forming an endless liquid loop in said channel, said channel being movable with respect to said liquid mass on angular acceleration of said channel, to cause a relative circulatory motion of said liquid within said channel relative to the walls of said channel, and means in said case cooperating with said liquid on relative motion of said liquid and said channel walls, to sense the relative displacement of said liquid and said walls on angular acceleration of said channel.

No references cited.